United States Patent [19]

Bauermeister et al.

[11] 4,351,365

[45] Sep. 28, 1982

[54] THERMALLY INSULATED TUBE

[75] Inventors: Klaus Bauermeister, Seelze; Gerhard Ziemek, Langenhagen; Bernd Eilhardt, Hanover, all of Fed. Rep. of Germany

[73] Assignee: Kabel-und Metallwerke Gutehoffnungshütte Aktiengesellschaft, Hanover, Fed. Rep. of Germany

[21] Appl. No.: 65,997

[22] Filed: Aug. 13, 1979

[30] Foreign Application Priority Data

Aug. 24, 1978 [DE] Fed. Rep. of Germany ....... 2836957

[51] Int. Cl.³ ................................................ F16L 9/14
[52] U.S. Cl. ..................................... 138/149; 138/132; 138/144

[58] Field of Search ............... 138/149, 132, 144, 113, 138/DIG. 9

[56] References Cited

U.S. PATENT DOCUMENTS 3,559,660 2/1971 Rollins ................................ 138/149

Primary Examiner—Frederick R. Schmidt
Attorney, Agent, or Firm—Ralf H. Siegemund

[57] ABSTRACT

A tube system, which includes an inner and a concentric outer tube, is provided with a spacer made by cutting oblique notches into a polyurethane foam layer on a paper ribbon and by helically wrapping the ribbon onto the inner tube, the oblique and tapered foam elements pointing inwardly or outwardly, but the notches are aligned to form axial ducts. After forming the outer tube about the spacer, these ducts are filled with material that foams in situ.

5 Claims, 4 Drawing Figures

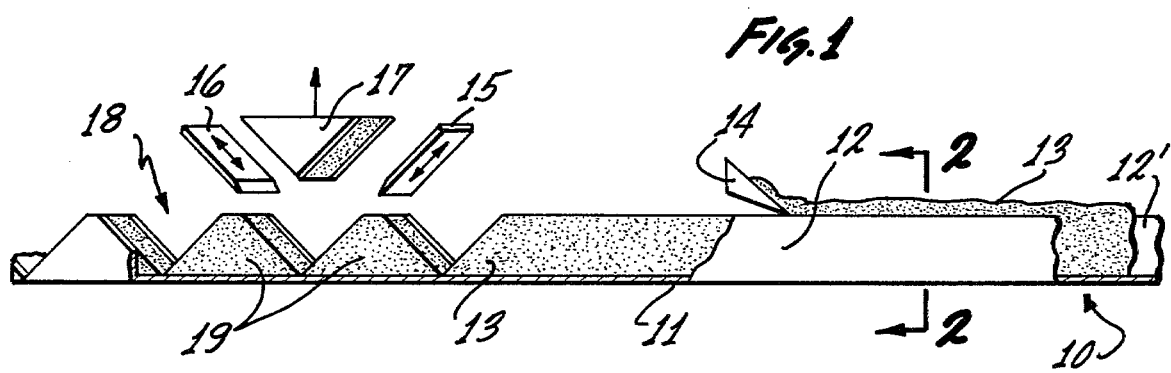
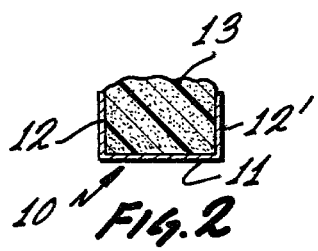
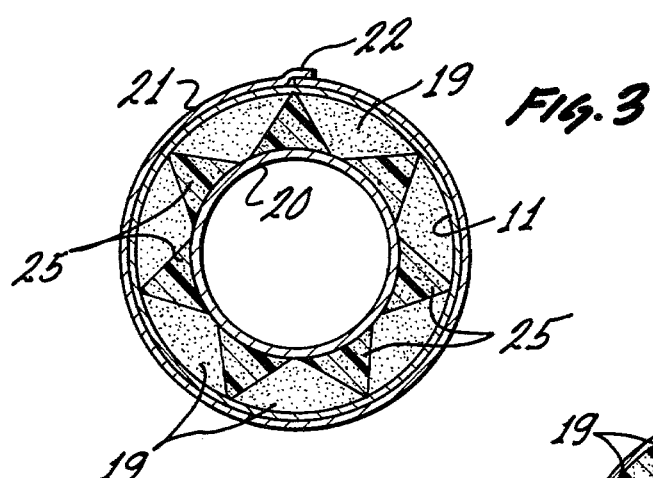
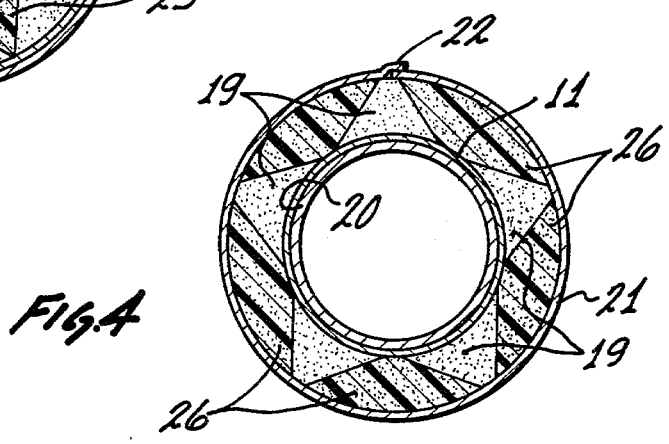

THERMALLY INSULATED TUBE

BACKGROUND OF THE INVENTION

The present invention relates to a thermally insulated conduit and more particularly, the invention relates to a tube system which is comprised of an inner tube, an outer tube being arranged coaxially to the inner tube, and a spacer construction disposed in between these tubes to hold them in concentric relation while thermally insulating them from each other. The invention relates in particular to the spacer construction and to the assembling of such a coaxial tube or conduit system.

The German printed patent application No. 1,960,932 describes a conduit system of the type referred to above and in which the inner tube is preferably a copper tube while the outer tube has resulted from folding a metal or synthetic ribbon in longitudinal direction around the inner tube. The spacer construction is a paper string helically wound around the inner tube prior to forming the outer tube about the inner tube while any residual space between the tubes has subsequently been filled with a synthetic foam, such as polyurethane. Such a tube assembly is, however, disadvantaged by the fact that the helical spacer impedes the distribution of the foam. This is particularly true when the radial distance between the tubes is rather small. As a consequence, voids have existed in the foam layer which have impeded the strength of the assembly.

DESCRIPTION OF THE INVENTION

It is an object of the present invention to provide a new and improved thermally insulated conduit system which includes an inner tube, an outer tube concentric to the inner tube, and a spacer construction between them, but avoiding the deficiencies outlined above.

It is, therefore, an object of the present invention to provide a new and improved insulation and spacer construction between an inner and an outer tube, wherein the insulation is free from cavities and voids.

It is a specific object of the present invention to improve coaxial tube systems and the making thereof, whereby an inner tube is provided, for example, as a seamless, drawn copper tube; a spacer is formed about that tube; and an outer tube is formed about the spacer, whereby the spacer includes foam elements.

In accordance with the preferred embodiment of the present invention, it is suggested to improve a spacer construction as per the specific object of the invention by providing a spacer in which a rigid foam is deposited on a carrier ribbon, and V-shaped notches are cut into the foam, preferably at an oblique orientation to the length extension of the ribbon, resulting in outwardly tapering elements held together by the ribbon. This assembly is helically wrapped around the tube which will become the inner tube, whereby the taper may extend radially inwardly or outwardly, and the outer tube is formed on and around the spacer. The notches in the spacer are more or less axially aligned and define channels or ducts which are filled with a substance that will foam in situ. This procedure makes sure that subsequently the entire ring space between the two tubes is filled with foam at a very high degree of foam development. As will be described in detail below, the particular spacer is well suited for continuous tube making and assembly.

The preferred embodiment of the invention, the objects and features of the invention, and further objects, features and advantages thereof will be better understood from the following description taken in connection with the accompanying drawings.

DESCRIPTION OF THE DRAWINGS

FIG. 1 is a side view of a spacer in accordance with the preferred embodiment and as it is being made.

FIG. 2 is a section view taken along Line II—II in FIG. 1.

FIG. 3 is a section view through a coaxial tube system, using a spacer of the type shown in FIG. 1, wherein the spacer elements are directed radially inwardly.

FIG. 4 is a section view through a coaxial tube system, showing a spacer of the type shown in FIG. 1 wrapped around the inner tube with radially outwardly oriented spacer elements.

Proceeding now to the detailed description of the drawings, FIGS. 1 and 2 show a carrier ribbon 10, having a U-shaped cross section and defining, therefore, an elongated trough. This carrier trough has a bottom 11 and sides such as 12 and 12' and is preferably made of a paper, having a high tensile strength.

As ribbon 10 is, for example, unreeled from a supply and folded up; it assumes the U-shaped cross section and forms a trough. Guide elements (not shown) may ensure that the sides 12 and 12' do stand upright. This trough is now being filled with a substance caused to foam in situ. The composition applied may be a foaming polyurethane. This way, one produces a filling 13 of rigid polyurethane.

As indicated schematically by way of a blade 14, the top of the polyurethane filling is cut to a uniform level as, for example, the level of the sidewalls of the trough which, however, is not essential. The determining factor for leveling-by-cutting is the radial spacing between the coaxial tube system to be made, and in which this assembly of FIGS. 1 and 2 is to serve as a spacer.

It is important to note that the foaming process encounters no resistance in the vertical, so that the material can foam freely and to the maximum extent possible. The foam is, of course, retained by the sidewalls 12 and 12'. Moreover, the foam will adhere to the paper carrier, even after curing. Thus, the sides 12 and 12' need to be held upright only during filling and foaming. After the foam has adhered, has assumed its shape, and has become rigid, the assembly is selfsupporting and the sides 12 and 12' will not fold or snap back.

In accordance with the next step, rotating blades, such as 15 and 16, cut V-shaped notches into foam 13 (and paper sidewalls), so that V-shaped pieces 17 can and will be removed, and notches 18 remain between the outwardly or upwardly tapering rigid foam elements 19 which remain. Care must be taken not to cut through bottom 11 of the carrier. The legs of the V-shaped notches should join a little above the paper as the resulting rack-like object should remain coherent.

The spacer so produced is a carrier ribbon with individual tapered spacer elements 19. The tapered elements 19 have narrow but flat tops. These flat tops will serve as support surfaces, so that elements 19 should not have pointed, edge-like tops. Moreover, it can be seen from FIG. 1 that the V-shaped notches 18 and, therefore, the elements 19 are not cut at right angles to the longitudinal direction (and carrier advance; see arrow). Rather, the notches are obliquely oriented. The angle to the longitudinal direction and ribbon extension should be equal to the pitch of the spacer after it has been wrapped helically onto a tube (infra), so that these notches will extend axially in relation to that tube.

The spacer made in this fashion may now be wound onto a spool, drum, etc., for further storage; the notches permit this kind of treatment because they provide the ribbon as a whole with a certain degree of flexibility, even though the polyurethane is quite rigid. Storage is not mandatory, but possible.

FIG. 3 illustrates a first example in which the spacer made as per FIG. 1 can be used. The figure shows an inner tube 20 around which the spacer has been wound in a helical fashion, so that the flat top apices of the elements 19 rest against tube 20. The ribbon 10, or more precisely its bottom portion 11, establishes and assumes a helical tubular contour. One may employ here a regular coiler which unwinds the spacer from its storage spool or drum and wraps it around the inner tube.

An outer tube 21 has been formed subsequently, for example, by longitudinally folding a metal, or other strip, skelp, or foil about this tubular spacer bottom. The strip material has overlapping edges 22, which are joined together by means of an adhesive, or by other means (e.g., welding).

It can readily be seen that if the number (n) of elements 19 per loop is an integer, every n-gap 18 will align axially to form a duct or channel. The walls of this duct extend axially because, as has been outlined above, the notches 18 were made to have an oblique component.

It is, of course, not necessary to align these gaps or notches precisely over any length of the conduit system being made, but the azimuthal displacement should be slight for the following reason.

The more or less aligned notches and gaps 18 are filled with a substance which will also foam, i.e., polyurethane. Due to the alignment, stagnation zones, or dead zones, or the like, are not present, and the space between the tubes 20 and 21 not yet occupied by the rigid foam elements 19 will now be completely occupied with the foam developed in situ in these ducts. The foam 25 in these ducts may also be of the rigid variety; but it is not essential, in principle, that these foam inserts assume a supporting function. Thus, the foam may well be soft or flexible.

The operation of manufacturing is a continuous one; that is to say, the spacer is wrapped around tube 20, and a little downstream thereof strip is folded to form tube 21. The foam can be injected from that open end into the aligned ducts as they are formed upon wrapping the spacer onto tube 20. Foam 25 can freely expand because these ducts are always open towards the point of wrapping the spacer.

Upon comparing FIG. 1 with FIG. 3, one can see that the coiling narrows somewhat the gaps 18 to be filled with foam 25. The angle of cutting (15, 16) must be rather shallow accordingly. The parameters to be considered are, of course, (a) the requirement of an integral number of elements 19 per loop; (b) large flow space, even after folding the V's up a little; (c) flat tops of a width sufficient for the elements to provide adequate support for the tubes in relation to each other. These parameters are quite compatible and permit a wide range of variations for each of them.

The existing constraint can be restated in that the taper angle must be sufficiently large, so that the ratio of the width of the flat top to the width of the base of an element is smaller than the ratio of the outer to inner diameter, respectively, of the inner and outer tubes. This rule actually yields a wide range of possibilities, so that the flat top can always be sufficiently wide for its support function while the integral number rule is maintained.

FIG. 4 illustrates an alternative use of the spacer. Again, an inner tube 20 is provided in appropriate fashion (e.g., a seamlessly drawn copper tube), but the spacer is now wrapped onto that tube with the elements 19 pointing radially outwardly. It can readily be seen that this provides for a still larger axial expansion space for the foam to be filled into the unoccupied space inside outer tube 21. This outer tube is made in the same manner as described in the reference to FIG. 3.

FIG. 4 shows also a particular feature for aiding the making of the outer tube. The strip should be folded, so that the edges overlap right at one set of axially aligned elements 19 which become a supporting element for bonding or welding the edges together.

The invention is not limited to the embodiments described above, but all changes and modifications thereof not constituting departures from the spirit and scope of the invention are intended to be included.

We claim:

1. Thermally insulated conduit system, comprising an inner tube, an outer tube arranged concentrically to the inner tube, and a spacer construction disposed in the space between the inner and outer tubes, the improvement for the spacer construction comprising:
   a high tensile strength ribbon, carrying outwardly tapering elements to define V-shaped notches between adjacent ones of the elements, the ribbon with elements being helically disposed in said space, the elements being made of a rigid foam of a polymer, the V-shaped notches being at least approximately aligned in axial direction to establish channels, the channels being also filled with foam.

2. The improvement as in claim 1, wherein the notches have an oblique orientation in relation to a longitudinal direction of the ribbon, corresponding to a pitch of the helix, so that walls of the notches run in said axial direction.

3. The elements as in claim 1, these elements being made of rigid foam polyurethane.

4. The improvement as in claim 1, wherein the ribbon is wrapped helically around the inner tube; the outer tube is carried by plates of the tapering elements.

5. The improvement as in claim 1, wherein the ribbon is disposed helically on the inside of the outer tube, peaks of the tapering elements sitting on the inner tube.

* * * * *